United States Patent [19]

Horrocks et al.

[11] 3,898,345

[45] Aug. 5, 1975

[54] METHOD FOR PREPARING MEAT-LIKE PROTEIN FOOD

[75] Inventors: Derek Horrocks; Keith Buckley; Peter Booth, all of Melton Mowbray, England

[73] Assignee: Mars Limited, London, England

[22] Filed: Jan. 7, 1972

[21] Appl. No.: 216,248

[30] Foreign Application Priority Data

Jan. 12, 1971 United Kingdom................ 1514/71

[52] U.S. Cl................. 426/274; 426/89; 426/104; 426/802
[51] Int. Cl............................................... A23j 3/00
[58] Field of Search............ 99/14, 17; 426/89, 104, 426/274

[56] References Cited
UNITED STATES PATENTS

| | | | |
|---|---|---|---|
| 2,785,069 | 3/1957 | Drodman............................. | 99/14 |
| 3,210,195 | 10/1965 | Kjelson et al........................ | 99/14 |
| 3,498,793 | 3/1970 | Page et al............................ | 99/17 |
| 3,772,035 | 11/1973 | Carp et al............................ | 426/274 |

Primary Examiner—James R. Hoffman
Attorney, Agent, or Firm—Davis, Hoxie, Faithfull & Hapgood

[57] ABSTRACT

A meat-like protein food having the appearance and chewing properties of natural muscle meat is made by impregnating bundles of artificial protein fibres with an emulsion containing a heat coagulable binding agent such as gluten, albumen or starch, forming at least at the surface of the impregnated bundles, for example by coagulation, a protective layer resistant to cooking conditions, and compacting together a number of the bundles in an oriented arrangement, coagulating the binding agent and bonding the bundles together. A cohesion of the fibres within the bundles is stronger than the bond between the bundles so that on cutting or chewing the product breaks down into a fibre bundle structure closely simulating the texture of muscle meat. Various binding agents can be used and various alternative techniques employed in forming the protective layer, which preserves the bundle structure during formation of the compacted product. The food preferably contains flavouring compositions such as combinations of sulphur-containing amino acids and sugars, and may employ blood pigments as colouring agents and may also contain comminuted natural meat.

7 Claims, No Drawings

METHOD FOR PREPARING MEAT-LIKE PROTEIN FOOD

The present invention relates to the preparation of an artificial meat-like protein food, and in particular to the preparation from spun protein of a product possessing a similar appearance and fibrous texture to that of cooked muscle meat. It is preferred, though not essential, that the flavour and the colour of the product should also closely resemble those of such meat, so that the product has a high degree of acceptance by both human beings and pet animals.

It is already known, for example from U.S. Pat. No. 2,682,466, that a simulated meat product with some of the firmness and bite characteristics of natural, cooked meat can be obtained by impregnating a tow of neutralised spun protein fibres with a heat coagulable binding agent followed by heat treatment. However, previous attempts to prepare synthetic meat based on spun protein have resulted in materials which either have a fine cotton-wool, sponge-like structure or are firm solid materials resembling cooked liver, and do not have the coarse-grained appearance of canned stewed steak or similar materials, nor its ease of collapse under light pressure into its constituent muscle bundles.

It is further known, for example from the same United States patent, to pass thick bundles of impregnated fibres through a molten fat bath just before combination, so as to obtain an improvement in the flavour and texture of the simulated meat product. This action results in the uptake of a considerable quantity of fat and, particularly where the fibre bundle diameter is of the order of 1–2 mm, the fat uptake approaches the weight of the impregnated fibre bundles and results in an unpleasant, plastic-textured, fatty-tasting product on baking. On canning and sterilizing, this high fat content separates from the meat chunks and forms an unacceptably thick fat layer at the head space end of the can.

In accordance with this invention there is now provided a meat-like protein food comprising generally oriented artificial fibres comprising edible protein bonded into bundles by a coagulated edible binding agent, each bundle being provided with at least a protective layer substantially resistant to hot moist processing or cooking, and the bundles being compacted and bound together in a similarly oriented manner, the cohesion of the bundles in the food being weaker than the cohesion of the fibres in the bundles.

Furthermore, the invention provides a process for the preparation of a meat-like protein food which comprises impregnating bundles of generally oriented artifical fibres comprising edible protein with an emulsion containing a heat coagulable binding agent, forming a protective layer substantially resistant to hot moist processing or cooking at least at the surface of the impregnated bundles, compacting together a number of the resulting bundles in a similarly oriented disposition and causing the bundles to be bound together into a coherent mass in which the adhesion of the bundles to each other is weaker than the cohesion within the bundles themselves.

In accordance with a typical procedure, a thin bundle or strip of substantially oriented fibres of neutral spun protein is impregnated with an aqueous emulsion comprised of binding agents and colouring agents together with offal meats, a flavour precursor composition and other flavours. The impregnated bundle is then treated to coagulate or otherwise produce a protective coating on the surface of the bundle whilst not completely coagulating the material. Surface coagulation may be effected by a heat treatment, as by frying the bundles in hot fat or by treatment with, for example immersion in, a hot solution of gelling agents. Alternatively, a protective coating may be formed on the surface of the fibre bundle by including reactive coagulable polymeric materials such as alginate or caseinate in the emulsion, together with a heat-coagulable binder, and then dipping the impregnated bundle in an appropriate reagent, for example, a solution of a calcium salt in order to coagulate the polymer. It should be mentioned that when the product has been further coagulated by subsequent heat treatment, it may be difficult or impossible to distinguish a protective layer on the bundles from the underlying portions of the bundle, especially when the surface layer has been coagulated by heat so that the surface layer and interior are of identical chemical composition. This does not affect the necessity for the provision of a surface of the bundle which is resistant to hot moist processing or cooking, in order to preserve the distinct bundle structure in the final product.

A further method of forming a protective layer on the bundles is to coat the impregnated bundles with a barrier material such as starch, flour, gums, gelatine powder or gelatine jelly. Subsequent heat treatment of the product then develops the bond within the bundles and a bond of diminished strength between the bundles. In some cases, the barrier material may itself strengthen both the bond between the bundles and the bond between the fibres, at least in a surrounding layer, thereby giving a product more resistant to cooking procedures but still retaining the differential between the adhesion of the bundles and cohesion of the fibres in the bundles.

A suitable number of bundles so treated, are compacted together by the use of light pressure, with the bundles being similarly oriented, i.e. lying substantially parallel to each other, to form a thick mass. The mass of lightly compressed, treated bundles may then be heat-treated, as for example in a gas oven, to complete the heat coagulation and to develop the meat-like flavour. This optional further heat treatment serves to set the mass into a solid structure to facilitate cutting into pieces and subsequent handling and mixing.

After thorough cooling the mass may be cut into pieces and further processed in the manner of natural meat in order to complete the flavour, colour and textural development, for example by stewing or canning and sterilising the product in gravy.

An outstanding property and advantage of this product is that after cooking it retains an integral structure but has a fragile texture readily collapsing under light pressure into a multitude of relatively coarse grains or bundles of tightly bound fibres and so closely resembles the primary and secondary muscle bundle structure of, for example, canned stewed steak. In the natural product this effect results from hydrolysis during the cooking process of the collagen fibres in the connective tissue sheath surrounding each muscle bundle.

In the case of a simulated fibrous meat product intended for use in canned pet food it is sufficient that the product should have a visually observable coarse bundle-like structure resembling the primary and secondary muscle bundle structure of meat, since the pet owner merely observes the superficial appearance of the product and its texture on transferring the product from the can into the animal's dish. By appropriate choice of binder and processing conditions, however, the product of this invention can display bite characteristics or mouth-feel typical of natural meat.

The thickness of the impregnated protein fibre bundle or strip is preferably between 0.5 and 5.00mm. The bundle will generally be equiaxial but may take the form of a flat ribbon with a breadth of up to 5cm. The spun protein fibre may consist of any edible protein of vegetable or animal origin or a combination of both. The fibre may or may not be extended with the use of other materials as, for example, with carrageenin as described in U.S. Pat. No. 2,947,644 and may or may not contain substantial amounts of non-proteinaceous materials such as alginates or fats. Moreover, the fibre may obtain a significant part of its structure from a non-proteinaceous matrix. The ratio of fibre to emulsion preferably ranges from 80 parts fibre/20 parts emulsion to 15 parts fibre/85 parts emulsion.

Instead of bundles of spun fibre, there may be employed a heat coagulated tow of interwoven and bound fibres which may be cut into strips and used to constitute the bundles of fibres. Such a porous strip can act as a substrate for the emulsion and perform as well as bundles of oriented spun fibres. Moreover, the fibres can be quite coarse so long as a porous, substantially absorbent bundle is obtained. An advantage resulting from using a bundle in which the fibres are already bound together is the increased toughness and handleability of the strip. In addition it should be observed the the fibres used are only approximately parallel.

One variant of our process consists of heating bundles of protein fibre which have been impregnated with an emulsion containing heat coagulable binding agents, colouring and flavouring agents to coagulate the surface of the impregnated bundles.

A number of bundles are then compacted together, whereby uncoagulated emulsion is exposed to contact points along the length of the bundles and subsequently serves to bind together the whole structure with a number of weak bonds. Alternatively the heat-treated bundles, still lying generally parallel, may be interwoven to achieve a degree of mechanical interlocking. A still further alternative approach is to completely heat set the impregnated bundles and then to treat the bundle surface with a dilute solution of a binder, for example egg albumen, which on cooking holds the whole structure together with weaker bonds than those existing between the fibres within the fibre bundles. The treated bundles are laid substantially parallel to form a thick mass, compacted and then further heat treated to completely set the structure.

In the heat coagulation technique the bundles of impregnated fibre may be heated by any suitable process, e.g. fat frying, immersion in hot gelling agent solutions, live steam or infra-red heating, and the temperature may range from 70°C to 200°C. The preferred temperature range is 80°C to 130°C. The heating time is related to the temperature and to the thickness of the fibre bundle, but may range between 0.5 second and 60 seconds. The preferred time is from 3 to 20 seconds. If frying is used, this may be carried out in any edible fat or oil. The preferred fat is unrefined beef dripping.

Gelling agents suitable for a hot immersion or spraying process include agar, carrageenan, Danish agar or gelatine, in the presence or absence of carob gum. The heat coagulable substances which may be added to the emulsion include vital wheat gluten, blood plasma, egg albumen, starches or cellulose ethers.

Another variant of our process consists of including cation reactive polymers such as sodium alginate, caseinate or pectate in the emulsion formulation and after the fibre bundles have been impregnated with the emulsion they are dipped into a dilute solution of, for example, calcium ions, in order to form a coagulated coating over the bundle surface. These bundles are then further treated in the manner described previously.

In employing this technique, the reactive coagulant material to be added to the emulsion may consist of any edible ionic polymeric material, for example, sodium alginate, sodium caseinate, sodium polypectate, sodium carboxymethyl cellulose or sodium carrageenate. The coagulating solution may contain edible cations such as potassium, calcium or aluminium ions. The coagulation process may be carried out either in the hot or cold, but elevated temperatures increase the coagulation rate. The quantity of cation reactive polymer to be added to the emulsion preferably ranges between 0.1 and 3%, and the cation concentration in the coagulating solution preferably ranges from 0.2 to 20%.

In this specification all percentages are by weight unless the context indicates otherwise.

Yet another variant of our process consists of coating the impregnated bundles with a thin protective layer of barrier material, for example starch, gums or gelatine, before combining the bundles in a parallel manner and lightly pressing together to disrupt the barrier at various points along the length of the bundles.

In carrying out this procedure, the coating agent may consist of flour, starch, gums, gelatine, collagen or gelatine solution. The amount of such coating used may range from 0.1 to 30% based on the impregnated bundles.

These various alternative procedures enable one to select the desired characteristics for the simulated meat product. For example, if the product is to be canned and sterilised in a static retort, then whilst it is important that the structure of the product should be sufficiently tough not to break down during the processes of cutting the product into chunks, mixing with other materials and filling into cans, the materials which help to achieve this toughness by cementing the whole into a coherent mass which can be easily cut and handled, such as carregeenan jelly or fat, are leached out of the product during sterilisation, leaving a fragile chunk with the easy collapse properties of stewed steak. If, however, the chunks are to be cooked in a manner where vigorous mechanical mixing is involved during the cooking process, then the binding technique chosen should be such that the inter-bundle binding agent forms tougher and more permanent bonds, as, for example, by the flour coating procedure.

A particular advantage of the present invention is that a simulated meat with a realistic fibrous meat-like texture can be obtained which contains only a relatively low proportion of expensive spun protein fibres and consequently the finished product has a low cost.

Another advantage is that the product of this invention can have a relatively open structure, which allows the penetration of sauces or gravies into the product matrix during processes of stewing or sterilisation, thereby giving a moist juicy mouthfeel to the pieces and causing retention of flavour and juiciness during their mastication into a suitable particle size for swallowing. Many previous simulated meat products based on spun protein have, on mastication, produced a dry, gritty sensation in the mouth which makes subsequent swallowing difficult and severely limits the quantity of product that can be eaten at any one time.

A further benefit which results from the penetration and absorption of gravy into the open-structured pieces of simulated meat during sterilisation is a large gain in weight, thus reducing even further the cost of the visible 'meat'content in the final dish.

Any appropriate flavouring agents may be used, e.g. vegetable or animal protein hydrolysates or yeast autolysates, meats or fish, and flavour potentiators such as "Ribotide", monosodium glutamate and maltol.

It is usually, however, desirable that the synthetic meat product should have a flavour which closely resembles the flavour of cooked natural meat. Whilst a large number of commercial meat flavourings are available and may be employed in the product of this invention, we have found that a particularly desirable meat-like flavour is obtained when a flavour precursor composition comprising a sulphur-containing amino acid and a sugar is heat processed within the matrix of the simulated meat product, and the flavour of any natural meat additives present is thereby enhanced or extended. For example, in the absence of such a flavour precursor composition, a simulated meat product containing liver does not have the taste or aroma of the natural, cooked meat, whereas in the presence of the flavour precursors, the natural sweet meat-like taste and aroma characteristics are readily evident and remain in the mouth throughout the mastication process.

The preferred flavour precursor composition consists of a sweet-tasting amino acid, a sulphur-containing amino acid, a hexose sugar, a pentose sugar and a flavour potentiator. An example of this system would be glycine, cysteine, glucose, xylose and monosodium glutamate, together with disodium inosinate and disodium guanylate. Other hexose sugars and other pentose sugars may be used. The hexose sugar may be omitted from the formulation and increased sweetness obtained by adding an increased amount of the sweet-tasting amino acid.

The sweet-tasting amino acid employed may be glycine, alanine, serine or their salts or mixtures of these materials. The preferred ingredient is glycine. The usage level in the emulsion employed in the simulated meat may vary from 0.02 to 1.0%. The preferred level is 0.5%. The sulphur-containing amino acid employed may be cysteine, cystine, glutathione or their salts or mixtures of these materials, or protein hydrolysates containing significant amounts of these materials. The preferred ingredient is cysteine. The usage level in the emulsion may be varied from 0.02 to 2.0%. The preferred level is 0.9%.

Any hexose sugar, for example glucose or fructose, may be used, glucose being preferred. The usage level in the emulsion may be varied from 0 to 2.0%. The preferred level is 0.7%. The pentose sugar used may be arabinose, xylose or ribose or mixtures of these materials, xylose being preferred. The usage level in the emulsion may be varied from 0.2 to 2.0%. The preferred usage level is 0.8%.

The flavour potentiator employed may be Ribotide (a 50:50 mixture of disodium inosinate and disodium guanylate) or monosodium glutamate or mixtures of these materials. The preferred blend of ingredients is a 5:95 blend of Ribotide and monosodium glutamate. The usage level in the emulsion may be varied from 0.1 to 2.0%. The preferred level of the preferred blend is 0.7%.

Whilst it is preferred that the components of the flavouring precursor composition be added unreacted to the emulsion employed in the simulated meat, it is possible to obtain some degree of flavour potentiation by the application of heat to a solution of the flavour precursor composition in order to cause interaction prior to its inclusion in the emulsion. However, this procedure results in the product having a somewhat reduced meaty flavour and a rubber-like aroma.

The inclusion of raw meats such as liver in the emulsion not only improves the flavour of the product but also enables high levels of gluten (a relatively cheap binding agent) to be used in the emulsion whilst still obtaining a low viscosity emulsion which contains no large particles or agglomerates of gluten and which therefore readily penetrates the bundles of fibre.

A wide range of edible colouring agents is available with which the colour of a particular meat type may be simulated. These include synthetic edible dyes, carotenoids, canthaxanthin, cochineal, carmine, caramel and pigments. A preferred colorant, however, which we have found particularly useful in simulating a natural red meat colour, is blood with or without the inclusion of sodium nitrite, since this produces a more natural and stable colour than the artificial dye-stuffs which have been employed in previous proposals for the production of simulated meat.

The blood used may be fresh whole animal blood from sheep, ox or pig (which may or may not have been treated with anti-coagulant) or blood derivatives such as red blood cells similarly treated. Alternatively, a suitable mixture of dried whole blood and water may be employed. The preferred material is whole, homogenised animal blood. Any level of blood in the emulsion may be used up to 30%. The preferred level is 14%. Sodium nitrite may be added to the blood in an amount up to 2000 parts per million. The preferred level is 1000 parts per million.

In simulating the colour of poultry meat, colouring matter may be omitted.

In the presently preferred method of production there are employed neutral spun protein fibres which are commercially available.

The emulsion is prepared by homogenising together heat binding agents, flavouring agents and the components of a flavour precursor composition, colouring agents and any other desired material, apart from the spun protein fibre, into a smooth creamy fluid containing no obvious particles. 1-2 mm diameter thick bundles of the spun protein fibre are impregnated with the emulsion by dipping the bundles into the emulsion and applying a gentle kneading action.

The impregnated bundles are heated by dipping into a hot solution of carrageenan and carob gum at a temperature of 80°–95°C for a period of approximately 20 seconds. A number of bundles so prepared are then placed substantially parallel to each other in a tray so as to fill it to a depth of 1 to 1½ inches, and light pressure applied so as to ensure close contact of the bundles and to allow junction points to be formed. Further heat is applied by placing the tray in a gas oven at 380°F for 25 minutes. The product is then thoroughly cooled, removed from the tray and cut into suitable sized pieces.

The following are examples of the production of simulated meat in accordance with the invention.

Example 1

Neutral spun vegetable protein fibre supplied by Courtaulds Limited was pressed free of excess liquid, cut into 7 inch lengths and separated into bundles of 1–2 mm diameter, each bundle containing 100 to 1000 fibres. The bundles of fibre were then impregnated with the following emulsion in the ratio of 30 parts of fibre to 70 parts of emulsion.

Emulsion formula

| Ingredient | | Percentage |
|---|---|---|
| Dried Vital Wheat Gluten | | 18.0 |
| Creamed Liver | | 18.0 |
| Yeast Hydrolysate | | 3.0 |
| Salt | | 0.5 |
| Monosodium Glutamate | | 0.3 |
| Flavour Precursor Composition | | 7.0 |
|   Glycine | 0.5 | |
|   Cysteine | 0.9 | |
|   Glucose | 0.7 | |
|   Xylose | 0.8 | |
|   "Ribotide" (50:50 mixture of disodium inosinate and guanylate) | 0.04 | |
|   Monosodium Glutamate | 0.66 | |
|   Water | 3.4 | |
| Homogenised Whole Blood (with 5% of a 2% sodium nitrite solution) | | 14.0 |
| Arachis Oil | | 10.0 |
| Water | | 29.2 |

The flavour precursor composition was prepared by dissolving the ingredients in water, adjusting the pH to 6 with sodium hydroxide and making up to volume with water. This was added to the other emulsion ingredients and homogenised to a uniform creamy suspension.

The surface of the impregnated bundles of fibre was coagulated by separately immersing the bundles in a bath of 0.75% carrageenan and 0.5% carob gum, maintained at a temperature of 85°C. for 20 seconds, and then the bundles were placed in a parallel manner in a 1-inch deep tray until the tray was full. Light pressure was applied to the bundles on placing them in the tray in order to obtain a compact uniform structure and to assist subsequent cohesion of the mass. The product was baked in a gas oven at 380°F for 25 minutes, removed and allowed to cool.

The solid mass was cut into 3/4-inch cubes, canned in a starch-carob gum gravy and sterilised.

The sterilised simulated meat chunks closely resembled pieces of canned stewing steak both in colour and in appearance, and in having a fragile texture which readily broke down under light pressure into "bundle"-like structures similar to the primary and secondary muscle bundle structures of canned steak. The chunks had a juicy, sweet, meat-like taste and aroma, breaking down in the mouth in a similar manner to canned steak.

EXAMPLE 2

Spun soya protein fibre manufactured by Worthington Foods Inc. under the Trade Mark "Fibrotein" was prepared for use by washing the fibre in an excess of 1% NaCl solution, followed by neutralisation to pH 5.5–6.0 in 1% salt solution with the use of sodium bicarbonate and completed by further washing in 1% salt solution. The fibre was pressed free of excess liquid and separated into bundles of 1–2 mm diameter (each bundle containing 100 to 1000 fibres). The bundles of fibre were then impregnated with the following emulsion in the ratio of 30 parts of fibre to 70 parts of emulsion.

Emulsion Formula

| Ingredient | Percentage |
|---|---|
| Dried Vital Wheat Gluten | 13.5 |
| Dried Blood Plasma | 4.5 |
| Creamed Liver | 18.0 |
| Yeast Hydrolysate | 3.0 |
| Animal Protein Hydrolysate | 7.5 |
| Homogenised Whole Blood (with 5% of a 2% sodium nitrite solution) | 14.0 |
| Arachis Oil | 10.0 |
| Water | 29.5 |

The impregnated bundles of fibre were fried separately in unrefined beef dripping at 120°C for 5–7 seconds and a sufficient number of these were placed in a parallel manner in a 1 inch deep tray until the tray was full. The product was then pressed lightly into a uniform mass and then baked in a gas oven at 380°F for 25 minutes, removed and allowed to cool. The solid mass was cut into ¾-inch cubes and canned in a starch-carob gum gravy and sterilised.

The sterilised chunks had a rich beef-like taste and possessed the appearance, colour and internal structure of canned steak.

EXAMPLE 3

A product was prepared as in Example 1, except that 1.5% gluten was replaced in the emulsion by sodium alginate and the emulsion-treated bundles were dipped into a cold solution of 10% calcium acetate and 1% acetic acid, instead of into a hot gelling agent solution, to effect coagulation of the surface of the bundle. The treated bundles were then placed in a parallel manner in a tray, pressed together, baked and further treated in the manner described in Example 1.

The sterilised simulated meat chunks possessed a good muscle bundle structure and a firm texture. Their taste was reminiscent of that of a sweet meat such as chicken after it has been cooked in white wine.

EXAMPLE 4

A product was prepared as in Example 1, except that the impregnated bundles were sprinkled with a light dusting of baker's flour, instead of being immersed in a hot solution of gelling agents, and were then compacted together and baked as described in Example 1.

The sterilised simulated meat chunks had a much tougher texture than the product of Example 1, but broke into bundle-like structures on the application of pressure to the chunks. Generally the chunks were similar in texture to fairly low grade, tough beef pieces.

EXAMPLE 5

A product was prepared as in Example 2, except that the bundles after impregnation with the emulsion were fully heat coagulated by baking them separately in an oven at 380°F for four minutes and were then sprayed with a solution containing 5% egg albumen and 10% blood, before being placed in a parallel manner in a tray and pressed lightly into a uniform, compact mass which was then baked as described in Example 2.

The sterilised simulated meat chunks had a firm texture but readily broke into muscle bundle-like structures on the application of pressure.

EXAMPLE 6

A product was prepared as described in Example 1, except that the bundle size was 1–2 mm thick but 5–10 mm broad, the emulsion contained no blood (replaced by water) and no creamed liver (replaced by cooked chicken muscle meat), and the bundles were immersed in the hot gelling agent solution for approximately 30 seconds. The sterilised product had the creamy white colour, general appearance and internal structure of cooked chicken muscle meat and possessed a juicy, sweet chicken-like taste and aroma.

We claim:

1. The method of making a protein food simulating muscle meat comprising:
   forming bundles of edible protein fibres impregnated with a binding agent coagulable at least by heat;
   immersing said bundles in a liquid coagulating medium and thereby forming a coagulated layer at least at the surface of said bundles;
   compacting together by pressure a plurality of such treated bundles in oriented arrangement;
   releasing said compacting pressure;
   and subsequently heating said arrangement of bundles to complete the coagulation of said heat-coagulable binding agent and to cohere the fibres of the bundles and bond said bundles together into a coherent product simulating muscle meat.

2. The method according to claim 1 wherein the liquid coagulating medium is hot fat.

3. The method according to claim 1 wherein the liquid coagulating medium is a hot solution of a gelling agent.

4. The method according to claim 1 in which said medium comprises a chemical coagulant for said binding agent.

5. The method of claim 1 in which the fibers of the bundles are cohered with a bond stronger than the bond between the bundles.

6. The method of making a protein food product simulating muscle meat comprising:
   forming bundles of edible protein fibres impregnated with a heat-coagulable binding agent;
   immersing said bundles in a hot solution of a gelling agent until a layer of said binding agent at least at the surface of said bundles is coagulated by the high temperature of said solution
   removing said bundles from said solution and allowing said bundles to cool and said gelling agent to set;
   compacting together by pressure a plurality of such treated bundles in oriented arrangement;
   releasing said compacting pressure;
   and subsequently heating said arrangement of bundles to complete the coagulation of said heat-coagulable binding agent and bond said bundles together into a coherent product simulating muscle meat.

7. The method of making a protein food simulating muscle meat comprising:
   forming bundles of edible protein fibres impregnated with a heat-coagulable binding agent and a chemically coagulable binding agent;
   immersing said bundles in a liquid medium containing a coagulant for said chemically coagulable binding agent until a coagulated layer is formed at least at the surface of said bundles;
   compacting together by pressure a plurality of such treated bundles in oriented arrangement;
   releasing said compacting pressure;
   and subsequently heating said arrangement of bundles to complete the coagulation of said heat-coagulable binding agent and bond said bundles together into a coherent product simulating muscle meat.

* * * * *